(12) United States Patent
Lancaster et al.

(10) Patent No.: US 6,614,632 B1
(45) Date of Patent: Sep. 2, 2003

(54) POWERFEED FOR A SUBMARINE COMMUNICATIONS SYSTEM

(75) Inventors: Philip Charles Lancaster, Hailsham (GB); George Wright Nicol, London (GB)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/468,343

(22) Filed: Dec. 21, 1999

(30) Foreign Application Priority Data

Dec. 30, 1998 (GB) .............................. 9828836

(51) Int. Cl.[7] .............................. H02H 3/00; H02H 9/08
(52) U.S. Cl. .............................................. 361/42
(58) Field of Search ........................ 361/42, 11, 170, 361/191; 307/43

(56) References Cited

U.S. PATENT DOCUMENTS

| 3,868,484 A | * | 2/1975 | Bolton et al. ............... 179/170 |
| 5,214,312 A | * | 5/1993 | Inoue ........................ 307/43 |
| 5,334,879 A | * | 8/1994 | Inoue et al. ................ 307/112 |
| 5,446,392 A | * | 8/1995 | Inoue et al. ................ 324/678 |
| 5,489,897 A | * | 2/1996 | Inoue .................... 340/870.39 |
| 5,841,205 A | * | 11/1998 | Webb ........................ 307/130 |

FOREIGN PATENT DOCUMENTS

| GB | 1 412 420   | 11/1975 |
| GB | 2 239 956 A | 7/1991  |
| GB | 2 248 373 A | 4/1992  |
| GB | 2 266 202 A | 10/1993 |
| GB | 2 275 834 A | 9/1994  |

\* cited by examiner

*Primary Examiner*—Brian Sircus
*Assistant Examiner*—Z Kitov
(74) *Attorney, Agent, or Firm*—Sughrue Mion, PLLC

(57) ABSTRACT

The present invention provides a method of establishing a virtual earth at a location in a submarine communications system including the steps of, at a powerfeed, detecting an incoming current to the powerfeed generated by a remote powerfeed and automatically modulating an electrical output of the powerfeed in dependence on the detected current to maintain the location of the virtual earth. The modulation of the powerfeed output is executed automatically and as such, a virtual earth can be maintained and established at the desired location on the power cable of the submarine communications system. There is a substantially reduced risk of error in the location of the virtual earth over conventional methods which are more reliant on operator accuracy.

17 Claims, 6 Drawing Sheets

POWERFEED FOR A SUBMARINE COMMUNICATIONS SYSTEM

BACKGROUND TO THE INVENTION

In a damaged or faulty power cable of a submarine communications system electrical current can leak to a sea-earth at the position of the fault. Electrolysis of the surrounding sea water destroys the cable whilst producing large quantities of gas. Should gas find a way within the cable and subsequently into the sea casing of an optical repeater or branching unit this can cause serious damage. The establishment of a virtual earth at the position of the fault would limit these effects until a ship could be sent to the site to repair the damaged cable.

In addition to the above, it is sometimes necessary to establish a virtual earth at a branching unit to ensure correct operation of the relays in the presence of a shunt fault and thereby isolate a faulty leg.

Methods of establishing virtual earths on cables of submarine communications systems already exist and one example relies on manual synchronisation between respective operators of two powerfeeds at opposite ends of a submarine cable. The two operators synchronise their actions by telephone such that they both start using an identical power-up rate at the same time. However, to allow for operator error in the synchronisation of the start-up of the ramps only slow power-up rates can be used. Even with a slow power-up rate, the establishment of a virtual earth at a precise location on the cable is heavily dependent on operator performance and as such, prone to human error. Any timing error greater than some critical value will mean that a virtual earth will not be created at the desired location on the cable. Furthermore, this method relies on the stability of a number of unpredictable external parameters, such as the earth's magnetic field. Magnetic storms, for example, could induce voltage differences in the cables which would affect the stability of the virtual earth.

SUMMARY OF THE INVENTION

According to a first aspect of the present invention, a method of establishing a virtual earth at a location in a submarine communications system comprises the steps of, at a powerfeed, detecting an incoming current to the powerfeed generated by a remote powerfeed and automatically modulating an electrical output of the powerfeed in dependence on the detected current to maintain the location of the virtual earth.

The modulation of the powerfeed output is executed automatically and as such a virtual earth can be maintained and established at the desired location on the power cable of the submarine communications system with a substantially reduced risk of error in the location of the virtual earth due to operator error as described above.

Preferably, the electrical output of the powerfeed is controlled in dependence on a series of voltage control values which are calculated in a predetermined manner by sampling the incoming current.

More preferably, the incoming current is sampled to determine a value for the magnitude of the incoming current and the rate of change of the incoming current.

The use of the rate of change of the incoming current to determine the output of the powerfeed enables the virtual earth to be maintained at the desired location on the power cable taking into account dynamic changes in the incoming current.

Preferably, the series of voltage control values are stored in a look-up table and may be output in sequence from the look-up table at a predetermined rate. The look-up table is up-dated periodically to take account of detected changes in the incoming current.

According to a second aspect of the present invention, a powerfeed for a submarine communications system, comprises means for detecting an incoming current to the powerfeed generated by a remote powerfeed, and means for automatically modulating an electrical output of the powerfeed in dependence on the detected current to establish and thereafter maintain the position of a virtual earth on the system.

The powerfeed is arranged such that the modulation of its output is executed automatically and as such a virtual earth can be maintained and established at the desired location on the power cable of the submarine communications system with a substantially reduced risk of error in the location of the virtual earth due to operator error as described above.

Preferably, the means for automatically modulating the electrical output of the powerfeed is arranged to generate a series of voltage control values which are calculated in a predetermined manner by sampling the incoming current.

Preferably, the means for automatically modulating the electrical output of the powerfeed comprises a memory which stores the series of voltage control values in the form of a look-up table, wherein the contents of the look-up table are arranged to be read out sequentially to control the electrical output of the powerfeed.

Preferably, the powerfeed further comprises a voltage output controller and a power converter, wherein the voltage output controller is arranged to receive voltage control values from the look-up table and generate a signal in dependence on this for controlling the output of the power converter.

Preferably, the powerfeed further comprises a voltage sensor for sensing the voltage appearing at an output of the powerfeed, the voltage sensor being arranged to feed back a control signal to the voltage output controller in dependence on this, wherein the voltage output controller is arranged to compare the output of the voltage sensor and the output of the look-up table to generate an error signal, the error signal being fed to control the voltage output of the power converter.

The use of an error signal to control the output of the powerfeed ensures that the output is contolled accurately and as such the virtual earth will be maintained in the desired location.

Preferably, the means for automatically modulating an electrical output of the powerfeed comprises a digital signal processor which may be programmed to up-date periodically the contents of the look-up table in dependence on the incoming current and the digital signal processor may comprise a memory storing computer executable instructions for performing the method according to the first aspect of the present invention.

According to a third aspect of the present invention a submarine communications system comprises a first powerfeed connected to a first end of a submarine power cable and a second powerfeed connected to a second end of the submarine power cable in which at least one of the powerfeeds is a powerfeed according to the first aspect of the present invention.

BRIEF DESCRIPTION OF THE DRAWINGS

An example of the present invention will now be described in detail with reference to the accompanying drawings, in which.

DETAILED DESCRIPTION

Figure 1:
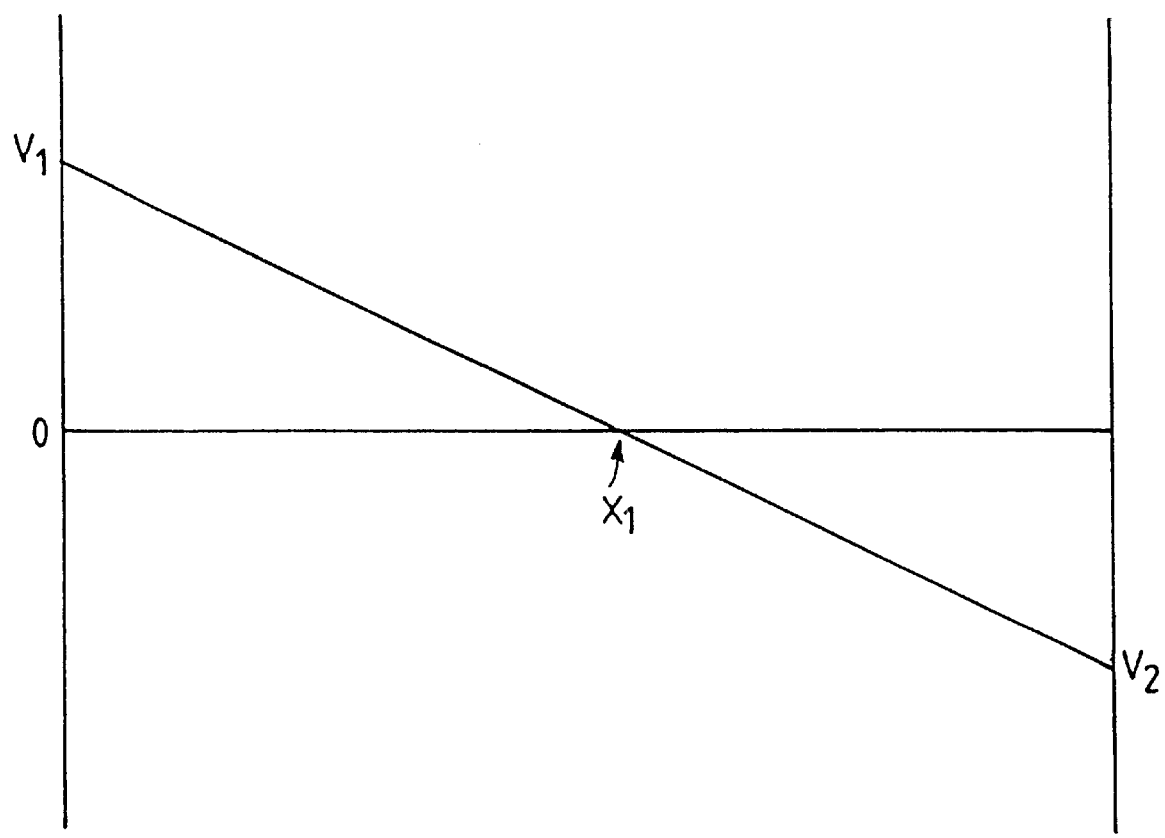
FIG. 1 shows a graph of displacement along a powered-up submarine cable against voltage on the cable for a double-end fed system.

FIG. 1 shows a graph of displacement along a powered-up submarine cable against voltage on the cable. If a first powerfeed provides a positive voltage $V_1$ at one end of the cable and a second powerfeed provides a negative voltage $V_2$ at the other end of the cable, a plot of potential along the cable will be as indicated by the graph in FIG. 1. A virtual earth is established at position $X_1$ on the cable. However, if voltage $V_1$ changes and voltage $V_2$ remains unchanged, the gradient of the line will change and this will cause position $X_1$ to move along the cable (not shown). Accordingly, voltage $V_2$ needs to be set in dependence on voltage $V_1$ to ensure that the virtual earth remains at position $X_1$ on the cable. Furthermore, when the first powerfeed is ramping up, voltage $V_1$ by definition is varying and although the voltage variation along the cable (as shown in FIG. 1) may not remain linear (see FIGS. 2 and 3), the reaction of the second powerfeed and the value of voltage $V_2$ must still be changed accordingly if position $X_1$ is to be kept static.

Figure 2:
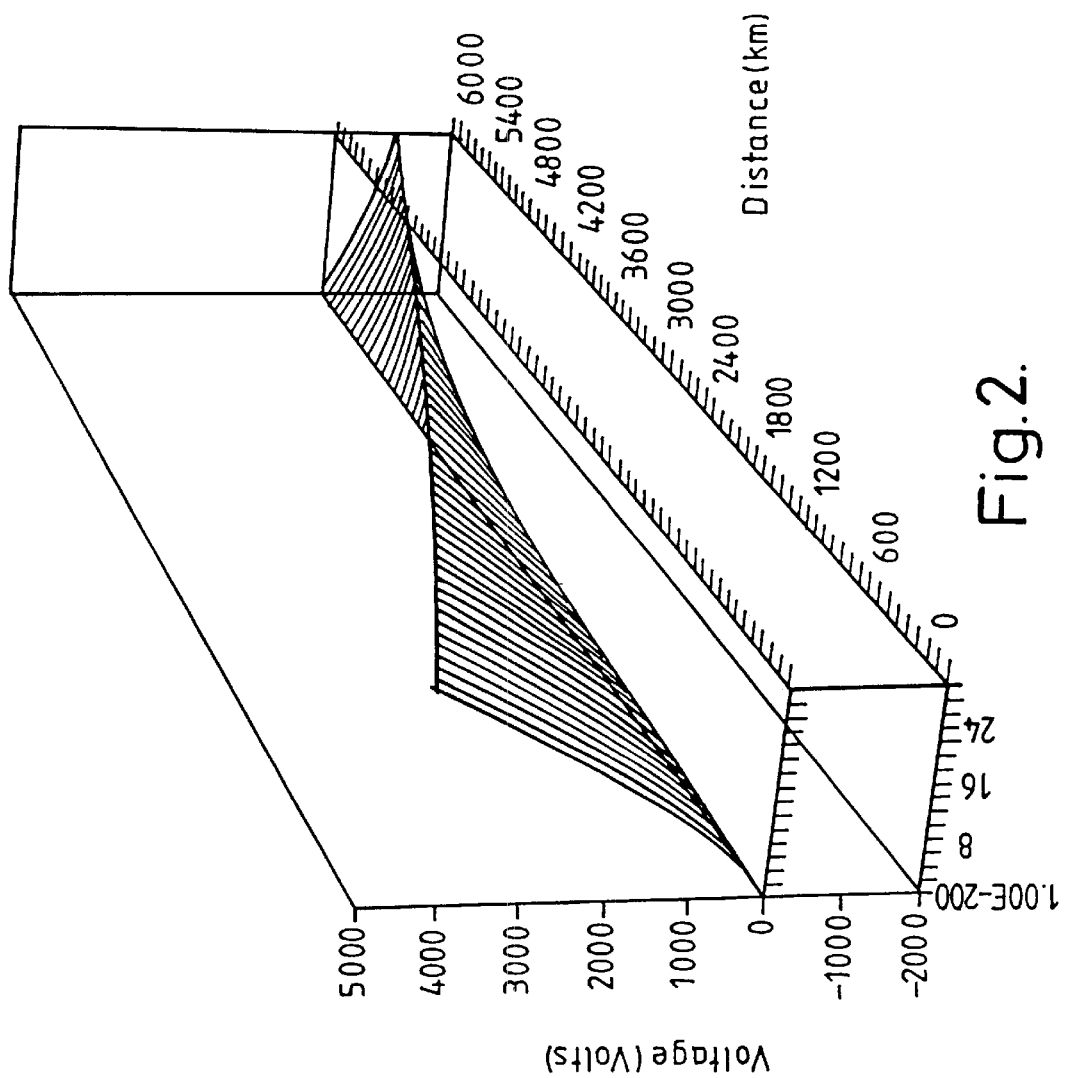
FIG. 2 shows a three dimensional plot of the voltage distribution along a submarine cable resulting from a predetermined constant current ramp at opposite ends of the cable.
Figure 3:
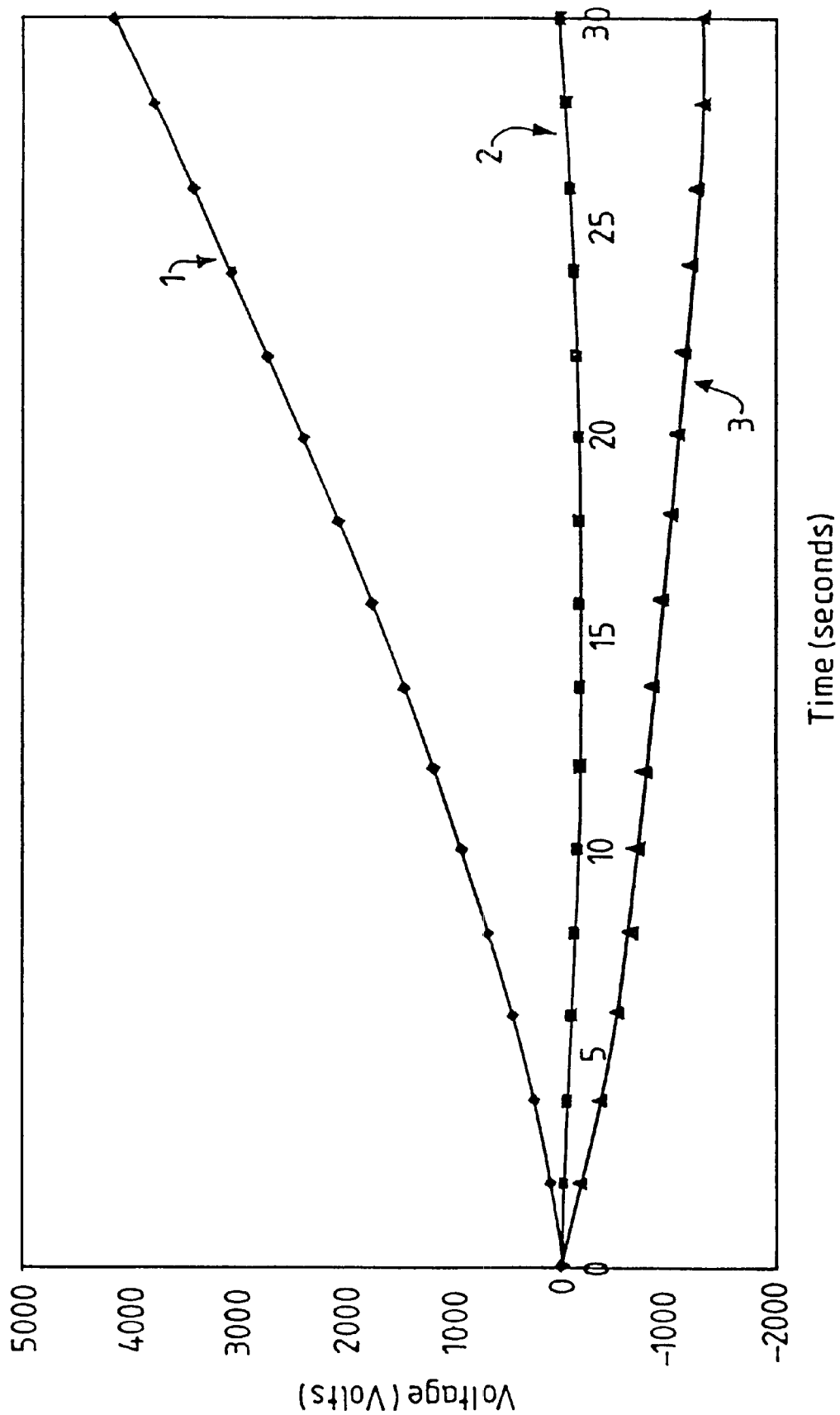
FIG. 3 shows three different sections through the plot of FIG. 2.

FIG. 2 shows a three dimensional plot of the voltage distribution along a 6000 km cable resulting from a current ramp applied at opposite ends of the cable, with the ramp function at one end being dependent on the ramp function at the other end, to maintain a constant virtual earth position in accordance with the present invention. FIG. 3 shows three sections through the plot of FIG. 2 to illustrate how by setting the ramping of the second powerfeed in dependence on the ramping of the first powerfeed, it is possible to obtain and maintain a virtual earth at a desired location on the cable. In the example shown, plot 1 represents a positive ramped voltage applied to one end of the power cable (distance 0 in FIG. 2), and plot 3 represents a negative ramped voltage applied at the other end of the power cable (distance 6000 km in FIG. 2). The virtual earth is maintained 5000 km from the first powerfeed (distance 5000 km in FIG. 2). As can be seen in FIG. 3, as time progresses, even though the magnitudes of the voltages being fed to each end of the cable are increasing, the voltage at a location 5000 km from the first powerfeed represented by plot 2 is maintained at approximately zero.

Figure 4:
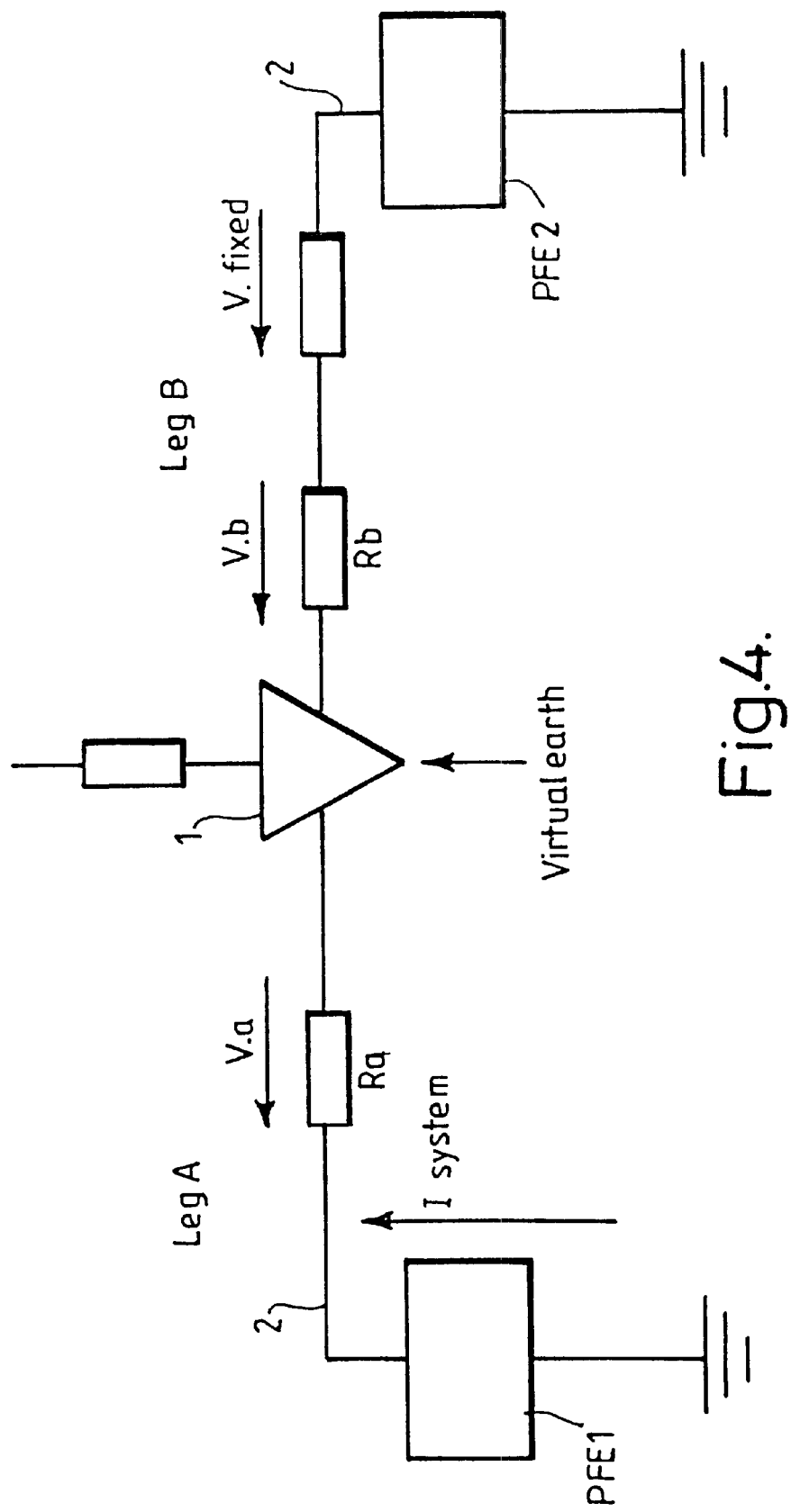
FIG. 4 shows a schematic representation of a submarine communications system having a powerfeed according to the present invention.

FIG. 4 shows a schematic representation of a submarine communications system in which a virtual earth is to be established at a branching unit 1. The system has a first powerfeed $PFE_1$ and a second powerfeed $PFE_2$ at respective ends of leg A and leg B of a submarine cable 2. As will be described in more detail below, when powerfeed $PFE_1$ powers up, coupling a ramping current signal $I_{system}$ onto the submarine cable 2, powerfeed $PFE_2$ detects this signal and responds by generating a ramping compensating voltage dependent on, amongst other factors, the detected current $I_{system}$ and the known characteristics of leg B of the submarine cable 2, to ensure the establishment and maintenance of a virtual earth at the branching unit 1.

Current $I_{system}$ is set by powerfeed $PFE_1$ and coupled to Leg A of the submarine cable 2 of the submarine communications system. The current $I_{system}$ causes a voltage drop over leg B of the submarine cable 2 equivalent to the current $I_{system}$ multiplied by the impedance of leg B. To counteract this drop, a matching voltage must be provided by powerfeed $PFE_2$ to establish and maintain a virtual earth at the branching unit 1. In a dynamic system in which current $I_{system}$ is changing, the voltage $V_{PFE2}$ provided by powerfeed $PFE_2$ must also change if the virtual earth is to be maintained at the branching unit 1.

In this case, in order to establish a virtual earth at the branching unit, the voltage $V_{PFE2}$ must be maintained at a value defined by the following equation:

$$V_{PFE2} = (I_{system} + f[C_a, C_b, dV/dt]) \times R_b + V_{fixed} \quad (1)$$

in which, $f[C_a, C_b, dV/dt]$ is a known function of the total cable capacitance and voltage application rate;

$R_b$ is the ohmic resistance of leg B of the submarine cable; and, $V_{fixed}$ is the total fixed voltage drop in leg B of the submarine cable due to any optical repeaters which are present.

There are a number of different methods to determine the values of voltage $V_{PFE2}$ defined by equation 1 above, which is after all a generalised solution to the current and voltage transmission equations for the system:

$$\frac{\partial^2 I(z,t)}{\partial z^2} = RC \frac{\partial I(z,t)}{\partial t} \quad (2)$$

$$\frac{\partial^2 V(z,t)}{\partial z^2} = RC \frac{\partial V(z,t)}{\partial t} \quad (3)$$

in which, z is the displacement along the cable;

I(z,t) is the current passing along the cable;

V(z,t) is the voltage of the cable; and,

R and C are, respectively, the resistance and capacitance per unit length of the cable.

One method relies on deriving an approximate analytical solution to equations (2) and (3), and it can be shown that:

$$V(L,t) = \quad (4)$$

$$V_0 - Rr_A t \left[ Lerfc(aL) \left(1 + \frac{2}{3}a^2 L^2\right) - \frac{2}{3a\sqrt{\pi}} e^{-a^2 L^2} (1 + a^2 L^2) \right] - \frac{2}{3a\sqrt{\pi}} Rr_B t$$

in which,

V(L,t) is the voltage provided by powerfeed $PFE_2$;

L is the distance along the cable from powerfeed $PFE_1$;

$V_0$ is the voltage at the virtual earth (preferably zero volts);

$r_A$ and $r_B$ are the current ramping rates at the powerfeeds at either end of the cable;

a is $$\frac{1}{2}\sqrt{\frac{RC}{t}};$$

and, erfc(x) is the complementary error function $$1 - \frac{2}{\pi}\int_0^x e^{-t^2}\,dt.$$

Alternatively, a more exact solution may be obtained using a numerical Newton-Raphson method. This is done by constructing an imaginary mesh with displacement on one axis and time on the other. Finite element analysis is then used to determine the voltage at each node of the mesh. The current at each node is calculated using equation 2 above for time $t_x$ and the voltage at the node representing the desired location of the virtual earth is then derived by the integral:

$$V = \int_0^{Z_p} -IR\,dz$$

in which,

V is the voltage at the node; and, $Z_p$ is the desired location of the virtual earth.

If the value of V is zero, then the steps are repeated for time $t_{x+1}$ but if this is not the case, the output of powerfeed $PFE_2$ is adjusted using a Newton-Raphson method.

In practice, a submarine cable will have a number of repeaters positioned along its length and so the numerical method must take account of these to ensure accurate results. In this case, the method used is on the whole the same, except, for nodes of the mesh which have associated repeaters, the formula to calculate their voltage becomes:

$$V = \int_0^{Z_p} -IR\,dz - V_r$$

in which, $V_r$ is the voltage drop across the repeater.

As current $I_{system}$ changes in response to the powering up of powerfeed $PFE_1$, without the operation of powerfeed $PFE_2$ the virtual earth would not be maintained in the desired position as explained above with reference to FIGS. 1 to 3.

Figure 5:
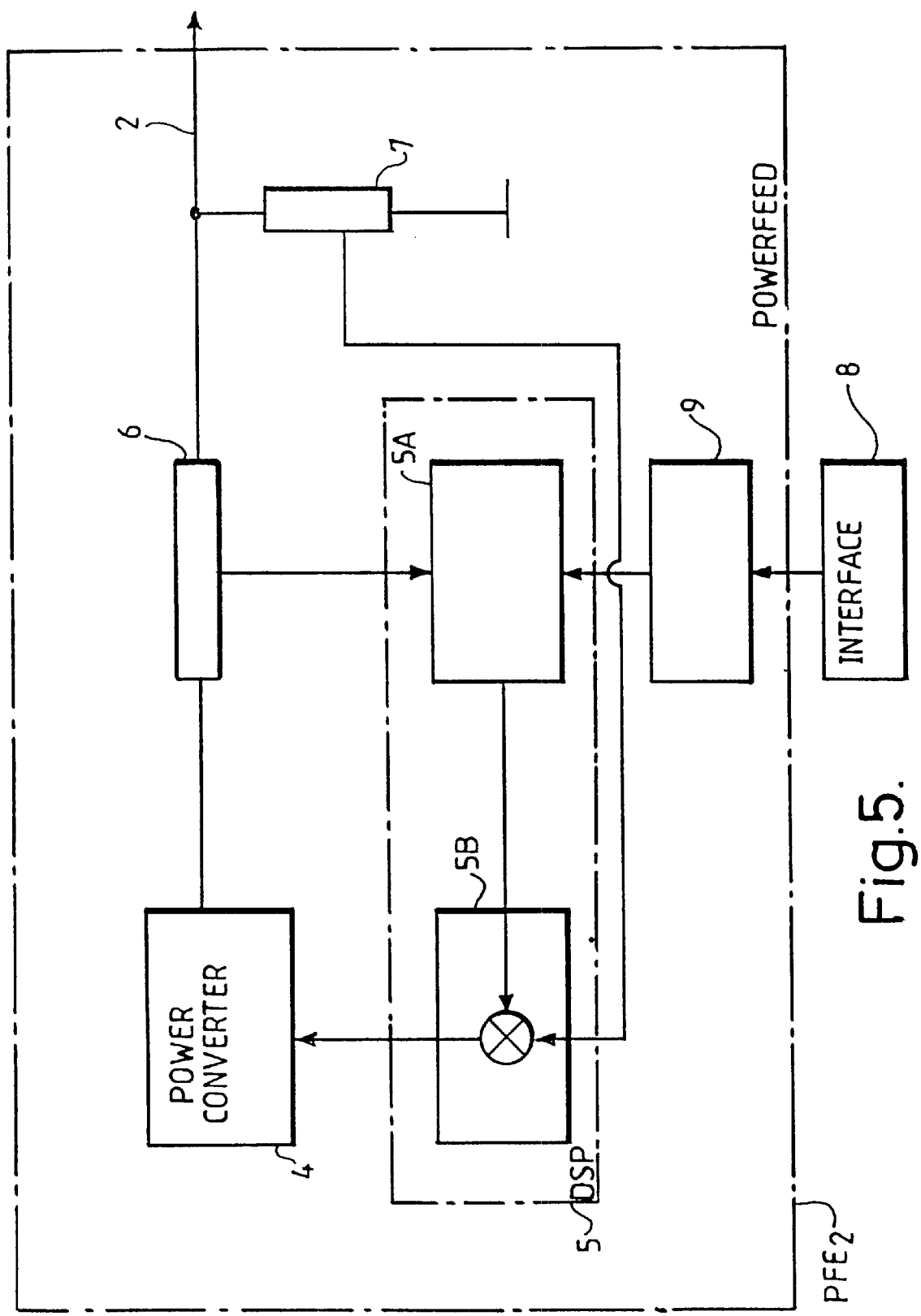
FIG. 5 shows a simplified block diagram of the powerfeed according to the present invention; and, FIG. 6 shows a simplified block diagram of a digital signal processor for generating set point coefficients used to derive a voltage output for the powerfeed of FIG. 5.

FIG. 5 is a block diagram showing powerfeed $PFE_2$. The powerfeed $PFE_2$ has a digital signal processor (DSP) 5 to generate a sequence of set point coefficients and a power converter 4 to generate and couple corresponding output voltages onto the submarine cable. The DSP 5 includes a unit 5A which provides the set point coefficients and a voltage output controller 5B arranged to receive the set point coefficients for controlling the voltage output of the powerfeed $PFE_2$ by means of the power converter 4. The unit 5A receives as input the a signal from a current monitor 6. The powerfeed $PFE_2$ also has a voltage monitor 7 the signal from which is supplied to the voltage output controller 5B. The voltage monitor 7 effectively forms the feedback element within a closed feedback control loop. In this example, the current and voltage monitors 6 and 7 include analogue-to-digital converters which provide digital values for the current and voltage to the DSP 5. Each set point coefficient generated by the DSP 5 is also a digital value used to derive an analogue output of the power converter 4. The output of the power converter 4 is monitored by the voltage monitor 7, a signal from which is combined with the set point coefficient to provide the closed loop feedback. A user interface 8 is provided which allows a user, via a microprocessor control unit 9, to select the required location of the virtual earth.

When powerfeed $PFE_1$ is powering up, the DSP 5 is arranged to control the power converter 4 to output a series of values to generate a ramping voltage output from powerfeed $PFE_2$. As will be described below, a look-up table 12 of values for the voltage set point coefficients dependent on, amongst other factors, the cable characteristics of leg B of the cable and the desired location of the virtual earth is calculated by embedded code within the DSP 5. In order to establish and maintain a virtual earth at any desired location on the submarine cable, a user must simply input a value for L, the distance between powerfeed $PFE_1$ and the desired location of the virtual earth, and then, in combination with the preprogrammed cable characteristics and the detected current $I_{system}$, the DSP 5 generates an appropriate look-up table of values within the unit 5A which are used to derive the output of powerfeed $PFE_2$. As such, a virtual earth can be established and maintained at any selected location on the cable. When powerfeed $PFE_2$ is first switched on, an initial sequence of values for the look-up table is calculated in dependence on the detected current $I_{system}$. This is then updated as and when necessary in dependence on the detected current $I_{system}$ and user input as described above.

Figure 6:
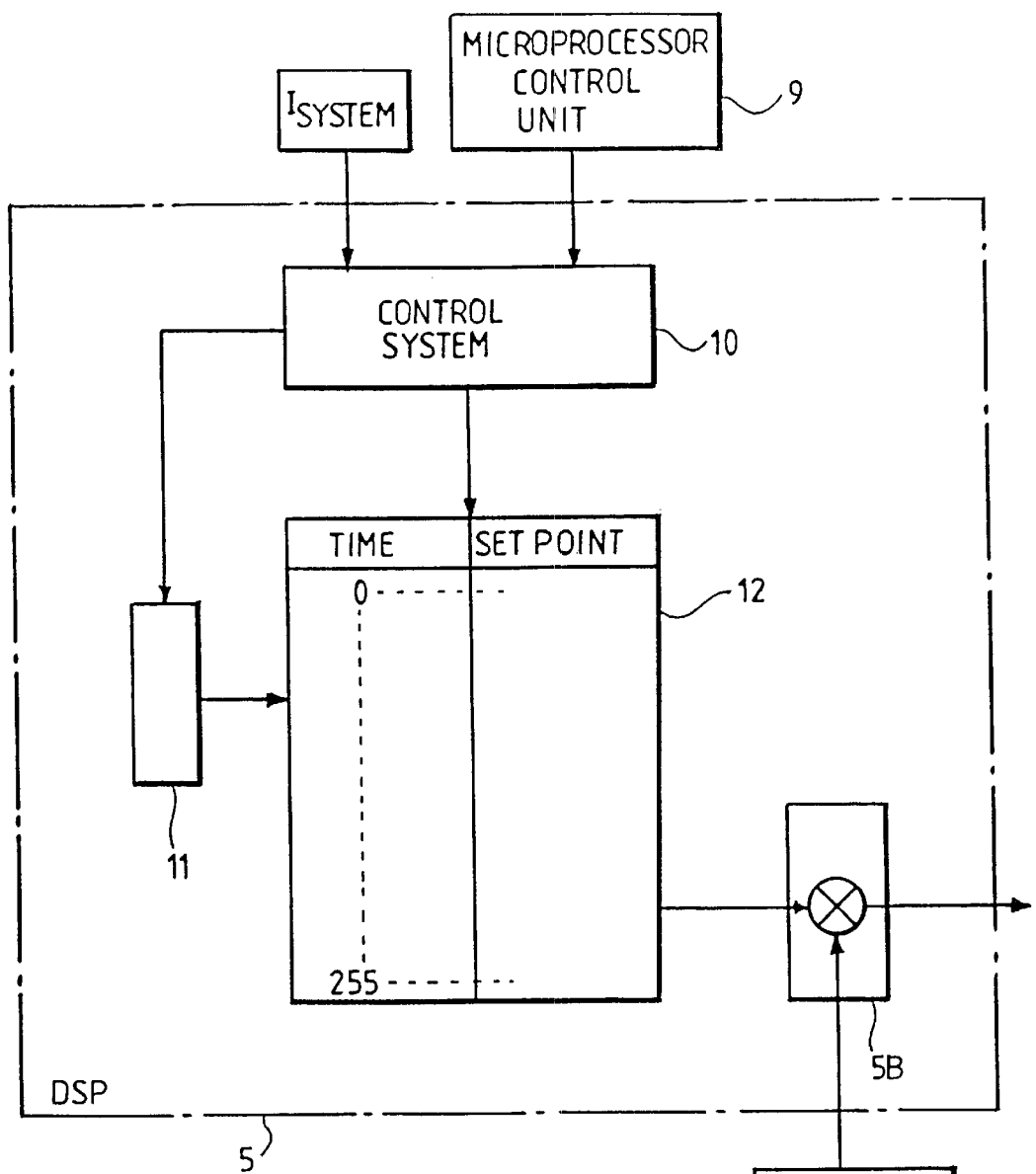

FIG. 6 shows a block diagram of the DSP 5 for generating a series of set point coefficients which are used to control the voltage output of the powerfeed $PFE_2$. The DSP 5 comprises a control system 10 which receives inputs from the current monitor 6 and the microprocessor control unit 9. The control system 10 has embedded code to enable it to calculate sequences of values required for the look-up table 12 in dependence on the detected current $I_{system}$, the detected rate of change $r_A$ of $I_{system}$ and the desired location of the virtual earth. It also controls a counter 11 configured to operate at a predetermined rate and access the look-up table 12 which will be stored in an associated memory once the values have been calculated. At any one time, the look-up table 12 holds a sequence of predetermined sample values calculated in accordance with, for example, equation (4), corresponding to values for a sequence of set point coefficients, in this case, to generate a ramping voltage signal.

The gradient of the voltage ramp defined by the look-up table 12 will, in combination with the information obtained from the detected current $I_{system}$, determine the position at which a virtual earth will be created on the cable. Since the values in the look-up table 12 are calculated in dependence on the current $I_{system}$, the detected rate of change $r_A$ of incoming current and the value of L, a user must simply enter a value for L via the user interface 8, and the embedded code within the DSP 5 will calculate an appropriate set of values for the look-up table. The DSP 5 is then operative to output each sample value in sequence as the set point coefficient.

The continual updating of the look-up table 12 allows the virtual earth to be maintained in its position irrespective of the change in the current $I_{system}$ or its rate of change $r_A$. If $I_{system}$ is increasing, the set point values must track this to ensure the output from powerfeed $PFE_2$ increases accordingly.

The DSP 5 is arranged to scroll sequentially through the stored values in the look-up table 12 adjusting the set point coefficient output value accordingly. The set point coefficients are selected to cause the output voltage from the power converter to track the change in the detected input current $I_{system}$. As such, a voltage is supplied to the submarine cable by powerfeed PFE$_2$ which ensures that the virtual earth is established and maintained at the desired location on the cable. The output from powerfeed PFE$_2$ is accurately controlled by the voltage control feedback loop. Referring to FIG. 5, if the feedback signal from voltage monitor 7 is less than the set point coefficient an error signal is generated by the output voltage controller 3 to increase the output from the power converter 4, whereas if the feedback signal from voltage monitor 7 is greater than the set point coefficient the resultant error signal causes the output from the power converter 4 to decrease, thereby performing closed loop control.

What is claimed is:

1. A method of establishing a virtual earth at a location in a submarine communications system, comprising the steps of:

at a powerfeed, detecting an incoming current to the powerfeed generated by a remote powerfeed; and automatically modulating an electrical output of the powerfeed in dependence on the detected incoming current to maintain the location of the virtual earth, wherein said virtual earth is established between a first station coupled to said powerfeed and a second station coupled to said remote powerfeed.

2. A method according to claim 1, in which the electrical output of the powerfeed is controlled in dependence on a series of voltage control values which are calculated in a predetermined manner by sampling the incoming current.

3. A method according to claim 2, in which the incoming current is sampled to determine a value for the magnitude of the incoming current and the rate of change of the incoming current.

4. A method according to claim 2, in which the series of voltage control values are stored in a look-up table.

5. A method according to claim 4, in which each voltage control value is output in sequence from the look-up table at a predetermined rate.

6. A method according to claim 4, in which the look up table is up-dated periodically to take account of detected changes in the incoming current.

7. A method according to claim 4, in which the look-up table is generated in dependence on the desired location of the virtual earth.

8. A submarine communications system, comprising:

at a powerfeed, means for detecting an incoming current generated by a remote powerfeed; and means for automatically modulating an electrical output of the powerfeed in dependence on the detected incoming current to establish and thereafter maintain the position of a virtual earth on the system, wherein said virtual earth is established between a first station coupled to said powerfeed and a second station coupled to said remote powerfeed.

9. The system according to claim 8, in which the means for automatically modulating the electrical output of the powerfeed is arranged to generate a series of voltage control values which are calculated in a predetermined manner by sampling the incoming current.

10. The system according to claim 9, in which the voltage control values define a voltage ramp.

11. The system according to claim 8, in which the means for detecting an incoming current comprise a current sensor arranged to detect the incoming current and output a value representative of the magnitude of the current.

12. The system according to claim 9, in which the means for automatically modulating the electrical output of the powerfeed comprises a memory which stores the series of voltage control values in the form of a look-up table, wherein the contents of the look-up table are arranged to be read out sequentially to control the electrical output of the powerfeed.

13. The system according to claim 12, further comprising a voltage output controller and a power converter, wherein the voltage output controller is arranged to receive voltage control values from the look-up table the and generate a signal in dependence on this for controlling the output of the power converter.

14. The system according to claim 13, further comprising a voltage sensor for sensing the voltage appearing at an output of the powerfeed, the voltage sensor being arranged to feed back a control signal to the voltage output controller in dependence on this, wherein the voltage output controller is arranged to compare the output of the voltage sensor and the output of the look-up table to generate an error signal, the error signal being fed to control the voltage output of the power converter.

15. The system according to claim 8, in which the means for automatically modulating an electrical output of the powerfeed comprises a digital signal processor.

16. The system according to claim 15, in which the digital signal processor is programmed to periodically up-date the contents of the look-up table in dependence on the incoming current.

17. The system according to claim 15, in which the digital signal processor comprises a memory storing computer executable instructions for performing a method of establishing a virtual earth at a location in a submarine communications system comprising the steps of, at a powerfeed, detecting an incoming current to the powerfeed generated by a remote powerfeed and automatically modulating an electrical output of the powerfeed in dependence on the detected current to maintain the location of the virtual earth.

* * * * *